Patented Feb. 6, 1951

2,541,005

UNITED STATES PATENT OFFICE 2,541,005

SYNTHETIC RESINS PREPARED FROM ALDEHYDE CONDENSATION PRODUCTS

Wilbur N. Oldham, Monrovia, Calif., and James R. Dudley, Cos Cob, Conn., assignors to American Cyanamid Company, New York, N. Y., a corporation of Maine No Drawing. Application October 16, 1946, Serial No. 703,488

17 Claims. (Cl. 260—67.6)

The present invention relates to synthetic resins and more particularly, to anion exchange resins, their method of manufacture, and their use in the purification of liquids.

Resins have previously been prepared from guanidines and biguanides by reaction with aldehydes and these reaction products, when insolubilized by urea or an aminotriazine, have found application as anion exchange materials. In the preparation of these resins, however, a certain amount of decomposition of the guanido compound is effected by the formaldehyde used as resinifying agent and the resins have therefore not been entirely practicable.

It is an object of the present invention to prepare improved water-insoluble granular anion exchange resins.

It is a further object of the present invention to prevent decomposition of biguanides or guanidines upon resinification with formaldehyde by reacting the guanido compound with a reactive aldehyde other than formaldehyde prior to resinification.

Still another object of the present invention is to prepare a water-insoluble anion active resin by bringing about reaction between an aldehyde, urea or an aminotriazine, and the condensation product of a guanidine or a biguanide with an aldehyde having more than one carbon atom.

It is another object of the present invention to provide a process for removing anions from, or exchanging anions in, liquids by means of the granular water-insoluble anion active resins here described.

These and other objects are attained by condensing a biguanide or a guanidine with an aldehyde having more than one carbon atom in substantially equimolar proportions, resinifying the resulting condensation product with an aldehyde and urea or an aminotriazine, and contacting a liquid containing anions with the insoluble anion exchange resin obtained.

The invention will be described in greater detail in conjunction with the following specific examples in which the proportions are given in parts by weight unless otherwise specified. The examples are merely illustrative, and it is not intended that the invention be limited to the details therein set forth.

Example 1

63 parts of melamine (0.5 mol)
121.5 parts of 37% formalin (1.5 mols as formaldehyde)
95 parts of the condensation product of benzaldehyde and biguanide (0.5 mol)
100 parts of water
3.4 parts of triethanolamine A mixture of the melamine, water, triethanolamine and formaldehyde is heated to about 80° C. until solution takes place. The solution is cooled to 35° C. and the biguanide condensation product is added. This mixture is then heated at 75° C. for 15 minutes and acidified with 60 parts of 37% hydrochloric acid.

A hard, white, porous gel forms immediately. It is cut into small pieces and cured for about 16 hours at 50° C. and about 5 hours at 100° C. The cured resin is ground and that portion thereof which is collected between 20 and 30 mesh screens is evaluated. The resin has a packed density of 20.7 lbs./cu. ft. and a capacity for the removal of anions from solution of about 12.8 kilograins as calcium carbonate.

Example 2

310 parts of melamine (2.5 mols)
610 parts of 37% formalin (7.5 mols as formaldehyde)
290 parts of the condensation product of p-dimethylamino-benzaldehyde and biguanide (1.25 mols)
2.3 parts of triethanolamine
500 parts of water The condensation product is added to the hot methylol melamine syrup which is prepared as described in Example 1. The resulting solution is heated for 10 minutes at 80° C. and acidified with 18 parts of 37% hydrochloric acid. A hard, yellow gel forms immediately accompanied by a large evolution of gas.

The gel is broken up and cured for 64 hours at 50° C. and 5 hours at 100° C. The light yellow-green hard product is ground, screened, and evaluated as an anion exchange material. It is found to have a density of 21.0 lbs./cu. ft. and a capacity of 5.4 kilograins as calcium carbonate per cubic foot of resin.

Example 3

120 parts of urea (2.0 mols)
486 parts of 37% formalin (6.0 mols)
280 parts of water
9 parts of triethanolamine
189 parts of the condensation product of benzaldehyde and biguanide (1.0 mol)
120 parts of 37% hydrochloric acid A mixture of the urea, formaldehyde, triethanolamine, and water is heated to 75°-80° C. until solution occurs. The benzaldehyde-biguanide condensation product is then added and after 5 minutes the hydrochloric acid is added to the resulting clear syrup.

A white, opaque gel forms in about 3 minutes. It is broken up into small pieces and cured for 16 hours at 50° C. and for 6 hours at 100° C. The cured resin is ground, screened to 20–40 mesh size, and found to have capacity for the removal of anions from solution of 6.3 kilograins as calcium carbonate per cubic foot of resin.

Example 4

63 parts of melamine (0.5 mol)
283.5 parts of 37% formalin (3.5 mols as formaldehyde)
150 parts of water
2.3 parts of triethanolamine
142.1 parts of the crotonaldehyde condensation product of guanidine carbonate (1.0 mol)
150 parts of 37% hydrochloric acid (1.5 mols)

A methylol melamine syrup prepared by heating the melamine, formaldehyde, triethanolamine, and water to 80°–85° C. is cooled to 60° C., and the guanidine carbonate condensation product is added. Intermittent heating for 10 minutes maintains the temperature between 70° and 80° C., after which time the hydrochloric acid is added to the clear red syrup. The syrup is heated for an hour between 70°–80° C. and then permitted to stand at about 20° C. for three days. The resulting clear, red-orange colored gel is broken up into small pieces and cured for 5 hours at 50° C. and for 5 hours at 100° C.

The cured product is ground, screened to 20–40 mesh size, and found to have a capacity for the removal of anions from solution of 7.8 kilograins as calcium carbonate per cubic foot of resin.

Example 5

180 parts of urea (3.0 mols)
567 parts of 37% formalin (7.0 mols as formaldehyde)
200 parts of water
10 parts of triethanolamine
142 parts of the crotonaldehyde condensation product of guanidine carbonate (1.0 mol)
114 parts of 37% hydrochloric acid The procedure of Example 4 is followed. When the hydrochloric acid is added to the syrup it gels within 2 minutes to give a rigid, orange gel. This is broken up to small pieces and cured for 8 hours at 50° C. and for 67 hours at 100° C. The cured product is ground, screened to 20–40 mesh size and found to have a capacity for the removal of anions from solution.

Example 6

126 parts of melamine (1.0 mol)
486 parts of 37% formalin (6.0 mols as formaldehyde)
250 parts of water
4.5 parts of triethanolamine
144 parts of the butyraldehyde condensation product of guanidine carbonate (1.0 mol)
150 parts of 37% hydrochloric acid A methylol melamine syrup is prepared by heating together the melamine, formaldehyde, triethanolamine, and water until solution occurs. The butyraldehyde condensation product is added to the syrup at 80° C., and after 10 minutes the hydrochloric acid is added to the resulting mixture. The syrup gels within 4 minutes and the red-orange, rigid gel obtained is broken up into small pieces and cured for 5 hours at 50° C. and for 5 hours at 100° C. The cured product is ground, screened to 20–40 mesh size, and found to have a capacity for the removal of anions from solution of 3.8 kilograins as calcium carbonate per cubic foot of resin.

Preparation of the condensation product of benzaldehyde and biguanide 127 parts of benzaldehyde (1.2 mols)
101 parts of biguanide (1.0 mol)
87.9 parts of benzene A mixture of the three ingredients is refluxed with stirring in equipment provided with a water take-off. The reaction is quite vigorous when the boiling point of benzene is reached and a gelatinous solid is precipitated. This solid becomes more viscous as the reaction progresses until after about 40 minutes when it suddenly becomes crystalline with the evolution of heat. About 17 parts of water have been eliminated. Refluxing is continued for an additional 45 minutes after which time a total of 17.7 parts of water has been collected, indicating 98% reaction.

The product is removed from the reaction vessel, triturated with acetone, filtered, washed with acetone and dried. The yield is 178 parts, 94% of the theoretical. The material melts over a range of 173°–178° C. with some decomposition.

Preparation of the condensation product of p-dimethylaminobenzaldehyde and biguanide 75 parts of p-dimethylaminobenzaldehyde (0.5 mol)
50.5 parts of biguanide (0.5 mol)
176 parts of benzene A mixture of the above ingredients is refluxed with stirring in equipment provided with a water take-off. No exothermic reaction occurs, but a yellow solid is precipitated when refluxing begins. Refluxing is continued for three hours during which time 6 parts of water are collected. The product is a soft, gummy, yellow solid which becomes granular upon the addition of two volumes of acetone. The mixture is filtered, solid washed with acetone, and 61 parts of the product representing a 52% yield are obtained.

Preparation of the crotonaldehyde condensation product of guanidine carbonate 50 parts of 90% guanidine carbonate (0.25 mol)
35 parts of crotonaldehyde (0.5 mol)
240 parts of methanol The above ingredients are charged into a reaction vessel equipped with a mechanical stirrer and a reflux condenser and are heated under reflux for about 3 hours. The reaction mixture is filtered and the filtrate obtained evaporated to dryness by means of steam. The residue obtained, while thermoplastic in nature, solidifies to a tan-colored solid upon cooling.

Preparation of the butyraldehyde condensation product of guanidine carbonate 50 parts of 90% guanidine carbonate (0.25 mol)
36 parts of butyraldehyde (0.5 mol)
240 parts of methanol The above listed ingredients are charged into a suitable reaction vessel and heated under reflux for 3 hours. The resulting slurry is filtered, and the filtrate evaporated to dryness. The tan-colored solid recovered is used directly in the preparation of an anion exchange resin as in Example 6.

Reactive aldehydes having more than one carbon atom other than those of the examples may be condensed with a guanido compound to form a resin intermediate suitable for the purposes of the present invention. Aldehydes such as p-aminobenzaldehyde, salicylaldehyde, furfural, acetaldehyde, heptaldehyde, acrolein, furylacrolein, cuminaldehyde, etc., are among the aldehydes generally useful.

Substituted biguanides may be condensed with any of the foregoing aldehydes just as biguanide itself may. Examples of suitable mono- and di-substituted biguanides are phenyl biguanide, N,N'-diphenyl biguanide, N,N-diphenyl biguanide, octadecyl biguanide, N,N- and N,N'-dioctadecyl biguanides; monobenzyl biguanide, N,N-dibenzyl- and N,N'-dibenzyl biguanides, N-ethyl-N'-benzyl biguanide, mono-furfuryl biguanide, N,N'-difurfuryl- and N,N-difurfuryl biguanides, monoethyl biguanide, N,N-diethyl, and N,N'-diethyl biguanides, butyl biguanide, isobutyl biguanide, tert. butyl biguanide and the corresponding N,N-dibutyl and N,N-dibutyl biguanides, octyl biguanide, N,N- and N,N'-dioctyl biguanides, etc. The corresponding salts such as the carbonates, acetates, etc., of the biguanides, for example, phenyl biguanide acetate, etc., may also be used.

Guanidine may be condensed with an aldehyde and the resulting condensation product resinified as described in Examples 4, 5 and 6. Substituted guanidines may also be used. Some examples of suitable mono- and di-substituted guanidines are methyl guanidine, N,N- and N,N'-dimethyl guanidines, ethyl guanidine, N,N- and N,N'-diethyl guanidine, N'-methyl-N-ethyl guanidine, phenyl guanidine, N,N-diphenyl guanidine, N,N'-diphenyl guanidine, benzyl guanidine, N,N'- and N,N-dibenzyl guanidines, furfuryl guanidine, N,N'- and N,N-difurfuryl guanidines, butyl guanidine, isobutyl guanidine, tertiary butyl guanidine and the corresponding N,N'- and N,N-dibutyl guanidines, octyl guanidine, N,N-dioctyl- and N,N'-dioctyl guanidines, octadecyl guanidine, N,N-dioctadecyl and N,N'-dioctadecyl guanidines, etc. The corresponding salts such as the carbonates, acetates, etc., of the guanidines, for example, guanidine carbonate, etc., may also be used.

Condensation products of guanidines or biguanides with aldehydes having more than one carbon atom may be resinified by reaction with urea or an aminotriazine and at least one aldehyde such as, for example, formaldehyde, acetaldehyde, crotonaldehyde, benzaldehyde, furfural, etc. These intermediate condensation products of amidine and aldehyde, preferably in a molar ratio of about 1:1 to 1:2, are relatively simple organic compounds. They are monomeric and not complex polymers.

Suitable aminotriazines include melamine, derivatives of melamine such as 2,4,6-trihydrazino-triamino-1,3,5-triazine, diamino-triazines such as the guanamines, e. g., formoguanamine, acetoguanamine, lauroguanamine, benzoguanamine, etc.

Mixtures of one or more aldehydes may be utilized to resinify the preformed guanido-aldehyde condensation products as may mixtures of urea and melamine or other aminotriazines. Similarly, small quantities of other thermosetting resinous compositions such as phenolformaldehyde condensation products may be incorporated in the composition of the present invention.

While I do not wish to be limited to any particular proportion of ingredients used, in general I prefer reacting the guanido condensation product, urea or aminotriazine, and aldehyde in the molar proportions of from 1:1:3 to 0.5:1:3.

While I do not wish to be limited to any particular theory of mechanism of the reaction which occurs in the formation of the resin intermediate, I believe that reaction between a biguanide and an aldehyde results in the formation of a dihydroguanamine. Taking the reaction between biguanide itself and benzaldehyde as an example, the reaction may be represented as follows:

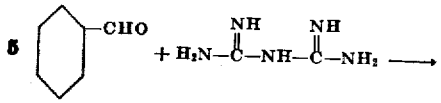

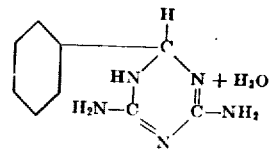

Similarly, I believe that condensation of a guanidine with an aldehyde results in the formation of a dihydropyrimidine. Considering the specific reaction between guanidine itself and acetaldehyde, for example, this may be represented as follows:

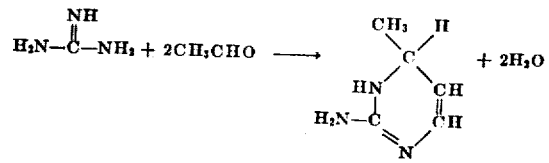

The final heat treatment or curing of the resins of the present invention is preferably carried out at a temperature of 95°–105° C., although other conditions including temperatures ranging from 50° C. up to about 125° C. or higher may be used.

The anion active resins of the present invention may be activated or regenerated by means of dilute alkaline solutions, such as for example, 0.1–25% aqueous solutions of sodium hydroxide, sodium carbonate, etc.

It is preferable to grind and screen the resins to a particle size of from about 8–60 mesh. Use of larger particles causes channeling, and smaller particles of resin have been found to pack, thus reducing the anion exchange efficiency of the material.

The resinous materials produced in accordance with this invention are suitable for the removal of all kinds of acids and anions in general from liquid media. They may be used to extract the strong mineral acids (preferably in relatively low concentrations) and organic acids such as acetic acid, oxalic acid, etc., from water and organic liquids. The anions of salts such as the chloride ion of ammonium chloride or the sulfate ion of ammonium sulfate may be removed by means of the resinous products described herein.

The anion active resins are useful for many purpose examples of which are the removal of acid from water, the removal of acid from alcoholic solutions, the purification of sugar juices, treatment of sugar solutions in general, the purification of pectin, the removal of acid from aqueous formaldehyde solutions, etc. While the resins are especially suitable for the removal of anions from aqueous media, they may be used to extract acids or anions from liquid media other than water. The resins may be used as absorbents for plant nutrients and as such may be used as a media for growing plants or as a means for applying nutrients to the soil.

To be sufficiently insoluble for practical use in the water purification art, resins should have a sufficiently low solubility that they will not be dissolved very rapidly by the solution to be treated. Thus, water should not dissolve more than 1 part of resin in 1000 parts of water when passed through a bed of resin (after the first cycle comprising an activation, exhaustion and reactivation of the resin).

The term "reactive aldehyde," as used in the present specification and claims, is intended to cover those aldehydes which will condense with a guanidine or a biguanide to form a monomeric condensation product which may then be insolubilized and resinified by treatment with an aldehyde and urea or an aminotriazine.

We claim:

1. A water-insoluble, granular, anion exchange synthetic resinous material obtained by a process including the step of heating together formaldehyde, a member of the group consisting of urea, diamino- and triamonio-triazines having a hydrogen atom attached to each amino nitrogen atom, and the monomeric heat condensation product of an aldehyde containing from two to ten carbon atoms with a member of the group consisting of biguanide, mono-monovalent hydrocarbon- and furfuryl-substituted biguanides, di-monovalent hydrocarbon- and furfuryl-substituted biguanides, guanidine, mono-monovalent hydrocarbon- and furfuryl-substituted guanidines, di-monovalent hydrocarbon- and furfuryl-substituted guanidines, and their salts, relative molar proportions of said aldehyde to said member in said condensation product being from 1:1 to 2:1.

2. A water-insoluble, granular, anion exchange synthetic resinous material obtained by a process including the step of heating together formaldehyde, a member of the group consisting of urea, diamino- and triamino-triazines having a hydrogen atom attached to each amino nitrogen atom, and the monomeric heat condensation produce of an aldehyde containing from two to ten carbon atoms with biguanide in a molar ratio of from 1:1 to 2:1.

3. A water-insoluble, granular, anion exchange synthetic resinous material obtained by a process including the step of heating together formaldehyde, a member of the group consisting of urea, diamino- and triamino-triazines having a hydrogen atom attached to each amino nitrogen atom, and the monomeric heat condensation product of an aldehyde containing from two to ten carbon atoms with guanidine in a molar ratio of from 1:1 to 2:1.

4. A water-insoluble, granular, anion exchange synthetic resinous material obtained by a process including the step of heating together formaldehyde, melamine, and the monomeric heat condensation product of benzaldehyde with biguanide in a molar ratio of from 1:1 to 2:1.

5. A water-insoluble, granular, anion exchange synthetic resinous material obtained by a process including the step of heating together formaldehyde, melamine, and the monomeric heat condensation product of crotonaldehyde with guanidine carbonate in a molar ratio of from 1:1 to 2:1.

6. A water-insoluble, granular, synthetic resinous condensation product capable of removing anions from solutions obtained by heating together formaldehyde, melamine, and the monomeric heat condensation product of p-dimethylaminobenzaldehyde with biguanide in a molar ratio of from 1:1 to 2:1.

7. A water-insoluble, granular, anion exchange synthetic resinous material obtained by a process including the steps of heating together formaldehyde, a member of the group consisting of urea, diamino- and triamino-triazines having a hydrogen atom attached to each amino nitrogen atom, and the monomeric heat condensation product of an aldehyde containing from two to ten carbon atoms with a member of the group consisting of biguanide, mono-monovalent hydrocarbon- and furfuryl-substituted biguanides, di-monovalent hydrocarbon- and furfuryl-substituted biguanides, guanidine, mono-monovalent hydrocarbon- and furfuryl-substituted guanidines, di-monovalent hydrocarbon- and furfuryl-substituted guanidines, and their salts, causing the reaction product to gel by addition of acid, curing the gel by heating, and granulating the cured gel, relative molar proportions of said aldehyde to said member in said condensation product being from 1:1 to 2:1.

8. The process which comprises heating together formaldehyde, a member of the group consisting of urea, diamino- and triamino-triazines having a hydrogen atom attached to each amino nitrogen atom, and the monomeric heat condensation product of an aldehyde containing from two to ten carbon atoms with a member of the group consisting of biguanide, mono-monovalent hydrocarbon- and furfuryl-substituted biguanides, di-monovalent hydrocarbon- and furfuryl-substituted biguanides, guanidine, mono-monovalent hydrocarbon- and furfuryl-substituted guanidines, and di-monovalent hydrocarbon- and furfuryl-substituted guanidines, and their salts, relative molar proportions of said aldehyde to said member in said condensation product being from 1:1 to 2:1.

9. The process which comprises heating together formaldehyde, a member of the group consisting of urea, diamino- and triamino-triazines having a hydrogen atom attached to each amino nitrogen atom, and the monomeric heat condensation product of an aldehyde containing from two to ten carbon atoms with a member of the group consisting of biguanide mono-monovalent hydrocarbon- and furfuryl-substituted biguanides, di-monovalent hydrocarbon- and furfuryl-substituted biguanides, guanidine, mono-monovalent hydrocarbon- and furfuryl-substituted guanidines, di-monovalent hydrocarbon- and furfuryl-substituted guanidines, and their salts, causing the reaction product to gel by addition of acid, curing the gel by heating, and granulating the cured gel, relative molar proportions of said aldehyde to said member in said condensation product being from 1:1 to 2:1.

10. The process which comprises heating together formaldehyde, a member of the group consisting of urea, diamino- and triamino-triazines having a hydrogen atom attached to each amino nitrogen atom, and the monomeric heat condensation product of an aldehyde containing from two to ten carbon atoms with biguanide in a molar ratio of from 1:1 to 2:1, causing the reaction product to gel by addition of acid, curing the gel by heating, and graulating the cured gel.

11. The process which comprises heating together formaldehyde, a member of the group consisting of urea, diamino- and triamino-triazines having a hydrogen atom attached to each amino nitrogen atom, and the monomeric heat condensation product of an aldehyde containing from two to ten carbon atoms with guanidine in a molar ratio of from 1:1 to 2:1, causing the reaction product to gel by addition of acid, curing the gel by heating, and granulating the cured gel.

12. The process of removing anions from liquids which comprises contacting a liquid containing anions with the water-insoluble, granular, anion exchange synthetic resinous material of claim 1, and separating said liquid from said material.

13. The process of removing anions from liquids which comprises contacting a liquid containing anions with the water-insoluble, granular, anion exchange synthetic resinous material of claim 7, and separating said liquid from said material.

14. The process of removing anions from aqueous liquids which comprises passing an aqueous liquid containing anions through a bed of the water-insoluble, granular, anion exchange synthetic resinous material of claim 7.

15. The process of removing anions from water which comprises passing water containing anions through a bed of the water-insoluble, granular, anion exchange synthetic resinous material of claim 4.

16. The process of removing anions from water which comprises passing water containing anions through a bed of the water-insoluble, granular, anion exchange synthetic resinous material of claim 5.

17. The process of removing anions from water which comprises passing water containing anions through a bed of the water-insoluble, granular, anion exchange synthetic resinous material of claim 6.

WILBUR N. OLDHAM.
JAMES R. DUDLEY.

REFERENCES CITED

The following references are of record in the file of this patent:

UNITED STATES PATENTS

| Number | Name | Date |
|---|---|---|
| 2,373,547 | D'Alelio | Apr. 10, 1945 |
| 2,373,549 | D'Alelio | Apr. 10, 1945 |